United States Patent
Kim (10) Patent No.: US 10,054,031 B2
(45) Date of Patent: Aug. 21, 2018

(54) APPARATUS AND METHOD FOR CONTROLLING COOLING FAN SPEED

(71) Applicant: HYUNDAI MOTOR COMPANY, Seoul (KR)

(72) Inventor: Kyung-Tae Kim, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 366 days.

(21) Appl. No.: 14/741,227

(22) Filed: Jun. 16, 2015

(65) Prior Publication Data

US 2016/0146090 A1    May 26, 2016

(30) Foreign Application Priority Data

Nov. 20, 2014   (KR) .................. 10-2014-0162535

(51) Int. Cl.
| | | |
|---|---|---|
| F04D 19/00 | (2006.01) | |
| F01P 7/02 | (2006.01) | |
| F04D 13/06 | (2006.01) | |
| F04D 25/06 | (2006.01) | |
| F01P 3/20 | (2006.01) | |
| F01P 1/06 | (2006.01) | |
| F01P 5/04 | (2006.01) | |
| F01P 5/12 | (2006.01) | |
| F04D 5/00 | (2006.01) | |
| F04D 27/00 | (2006.01) | |

(52) U.S. Cl.
CPC ............... *F01P 7/026* (2013.01); *F01P 1/06* (2013.01); *F01P 3/20* (2013.01); *F01P 5/04* (2013.01); *F01P 5/12* (2013.01); *F04D 5/00* (2013.01); *F04D 13/068* (2013.01); *F04D 19/002* (2013.01); *F04D 25/0673* (2013.01); *F04D 27/004* (2013.01)

(58) Field of Classification Search
CPC ................... F01P 7/02; F01P 7/04; F01P 7/14
See application file for complete search history.

(56) References Cited

U.S. PATENT DOCUMENTS

| | | | | |
|---|---|---|---|---|
| 4,598,687 A | * | 7/1986 | Hayashi | ............... F01P 3/20 |
| | | | | 123/563 |
| 5,151,016 A | * | 9/1992 | Her | ............... F04D 15/0218 |
| | | | | 417/32 |
| 2009/0050082 A1 | * | 2/2009 | Iwasaki | ............... F04D 13/06 |
| | | | | 123/41.49 |

FOREIGN PATENT DOCUMENTS

| | | | |
|---|---|---|---|
| JP | 2006118405 A | * | 5/2006 |
| JP | 2008-126798 A | | 6/2008 |
| JP | 2013-199893 A | | 10/2013 |
| JP | 2014-136524 A | | 7/2014 |
| KR | 20-1998-0045549 U | | 1/2000 |
| KR | 20-0170894 Y1 | | 4/2000 |
| KR | 10-2006-0069903 A | | 6/2006 |
| KR | 10-0862474 B1 | | 6/2008 |
| KR | 10-2012-0030848 A | | 3/2012 |

* cited by examiner

*Primary Examiner* — Patrick Hamo
(74) *Attorney, Agent, or Firm* — McDermott Will & Emery LLP (57) ABSTRACT

An apparatus for controlling a cooling fan speed includes a cooling fan motor operating a cooling fan. A pump is connected to the cooling fan motor in series. A relay has one side connected to the cooling fan motor or the pump and another side connected a battery so that power of the battery may be supplied to any one of the cooling fan motor or the pump.

8 Claims, 8 Drawing Sheets

APPARATUS AND METHOD FOR CONTROLLING COOLING FAN SPEED

CROSS-REFERENCE TO RELATED APPLICATION

This application claims the benefit of priority to Korean Patent Application No. 10-2014-0162535, filed on Nov. 20, 2014, the entire content of which is incorporated herein by reference.

TECHNICAL FIELD

The present disclosure relates to an apparatus and a method for controlling a cooling fan speed, and more particularly, to an apparatus and a method for controlling a cooling fan speed by using a pump.

BACKGROUND

A temperature of an internal combustion engine of a vehicle becomes high as the vehicle runs, and in general, the heated engine is cooled by a air cooling method or water cooling method. The air cooling method allows the engine to be contacted with atmosphere without additional supplement and prevents freezing and leakage of cooling water, and so on. However, cooling efficiency is low when temperature of outside air is high or the vehicle temporarily stops.

Thus, many vehicles apply the water cooling method that cools the engine by using cooling water. In the water cooling method, a water jacket is installed around a cylinder of the engine to cool the engine by circulating the cooling water stored in a radiator. Furthermore, in order to improve a cooling efficiency of the engine, a cooling fan for cooling the cooling water is provided at the radiator.

Figure 1A:
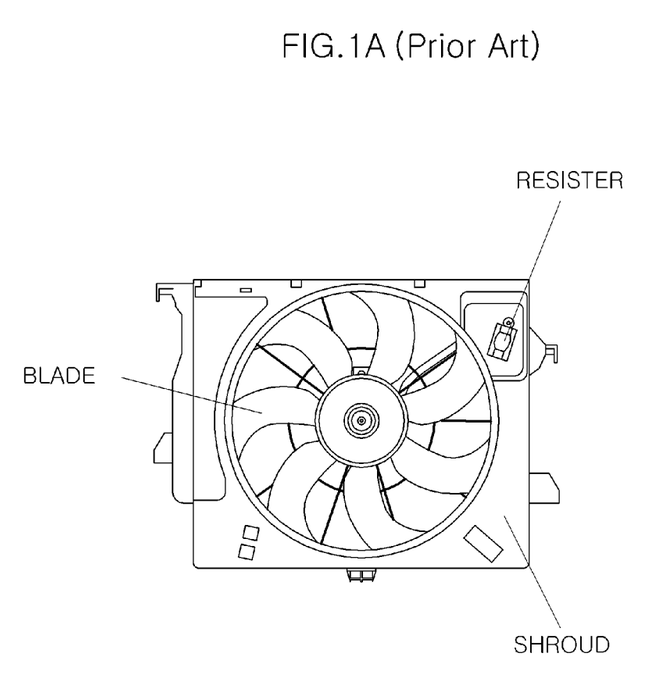
FIGS. 1A and 1B are views illustrating a single fan according to the prior art.
Figure 1B:
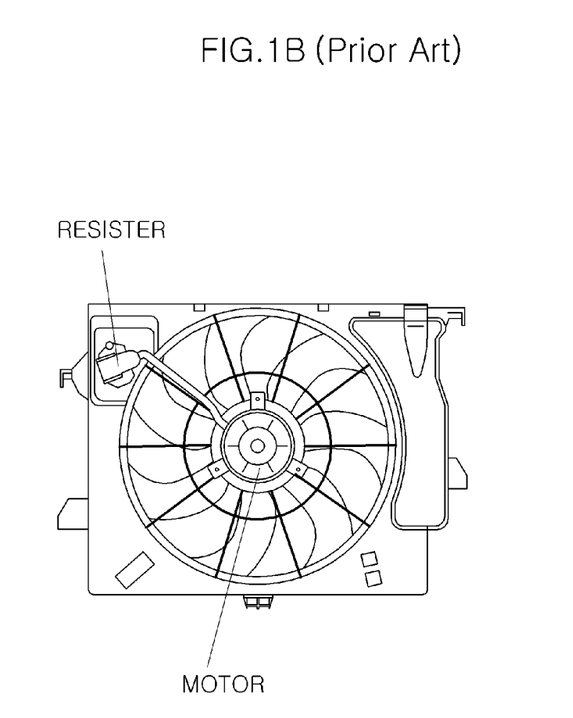

The cooling fan can be a single fan and a dual fan in accordance with the number of a motor. The single fan carries out the cooling using only a single motor, thus decreasing production cost. FIGS. 1A and 1B are views illustrating a shape of a single fan according to the prior art. Referring to FIGS. 1A and 1B, the single fan includes a motor for generating a rotating power and blades being rotated by the motor to generate air flow. Furthermore, the single fan includes a shroud fixing the motor and the blades and preventing the air generated by the blades from flowing backward. A resister is attached to one side of the shroud and controls a motor speed.

The resister radiates heat energy converted from a current induced to the motor and provides only the necessary amount of current to the motor, thereby lowering the motor speed. In this case, the radiated heat energy is not usable, and thus, the energy efficiency thereof decreases. Further, the temperature of the resister was risen up to the maximum 555° C., thereby fire risk of vehicles increases due to excessive heat of the resister.

SUMMARY

The present disclosure has been made in an effort to solve the above problems. An aspect of the present inventive concept provides an apparatus and a method for controlling a cooling fan speed which controls the cooling fan speed by using a pump for controlling a speed of the cooling fan using a resister.

An apparatus for controlling a cooling fan speed according to an embodiment of the present inventive concept may include a cooling fan motor operating a cooling fan. A pump is connected to the cooling fan motor in series. A relay has one side being connected to the cooling fan motor or the pump and another side being connected a battery so that power of the battery may be supplied to any one of the cooling fan motor or the pump.

The apparatus for controlling the cooling fan speed may further include an electronic control unit (ECU) configured to control the relay so that the power of the battery may be supplied to any one of the cooling fan motor or the pump in accordance with a cooling water temperature of an engine.

The apparatus for controlling the cooling fan speed may further include a cooling water temperature sensor measuring the cooling water temperature of the engine and providing the cooling water temperature to the ECU.

The pump may include a pump housing having a cylindrical shape and of which both ends are connected with a radiator hose.

The pump housing may include a projection portion having a half cylindrical shape of which an axis is perpendicular to a flow direction of the cooling water.

The pump may be directly connected to the relay and include an impeller motor disposed perpendicularly in a longitudinal direction of the pump housing.

The pump may include a rotation of axis connected to the impeller motor and an impeller circulating the cooling water in accordance with rotation of the impeller motor.

The rotation of axis of the impeller may be eccentric to the projection portion from a center of the pump housing and perpendicular to the longitudinal direction of the pump housing.

A method for controlling a cooling fan speed according to another embodiment of the present inventive concept may include a cooling water temperature measuring step of measuring a cooling water temperature of an engine via a cooling water temperature sensor. Whether the cooling water temperature measured at the cooling water temperature measuring step is greater than a first reference temperature is determined in a first determination step. Whether the cooling water temperature measured at the cooling water temperature measuring step is greater than a second reference temperature in a second determination step when it is determined that the measured cooling water temperature is greater than the first reference temperature. A cooling fan motor is operated in a cooling fan motor high speed operation step when it is determined that the measured cooling water temperature is greater than the second reference temperature.

The method may further include a pump operation step of operating a pump when it is determined that the measured cooling water temperature is less than the second reference temperature.

The method may further include a cooling fan motor low-speed operation step of operating the cooling fan motor, which is connected to the pump in series, with a voltage dropped at the pump after the pump operation step.

According to the present disclosure as described previously, the cooling fan speed is controlled by using the pump, thereby lowering fire risk of a vehicle and preventing energy efficiency from being lowered by radiation of heat energy converted from electrical energy. Furthermore, the present disclosure may increase a flow speed of cooling water so that cooling performance can be improved.

DETAILED DESCRIPTION

A word and term used in this specification and claim scope should not be limited to a typical or dictionary meaning and be interpreted as the meaning and concept in compliance with the technological thought of this invention based on the principle that an inventor may define the concept of a term properly in order to explain his/her own invention in the best way. Since the embodiment written in this specification and the configuration illustrated in the drawings are no more than the best desirable embodiment in the present inventive concept and do not represent all of technological thought in the present inventive concept, it should be understood that there can be various equivalents and transformation examples to replace these at the time of this application. In addition, a detailed description about the well-known function and configuration which may obscure the gist of the present disclosure unnecessarily may be omitted. Hereinafter exemplary embodiments of the present inventive concept may be described in detail with reference to the attached drawings.

Figure 2:
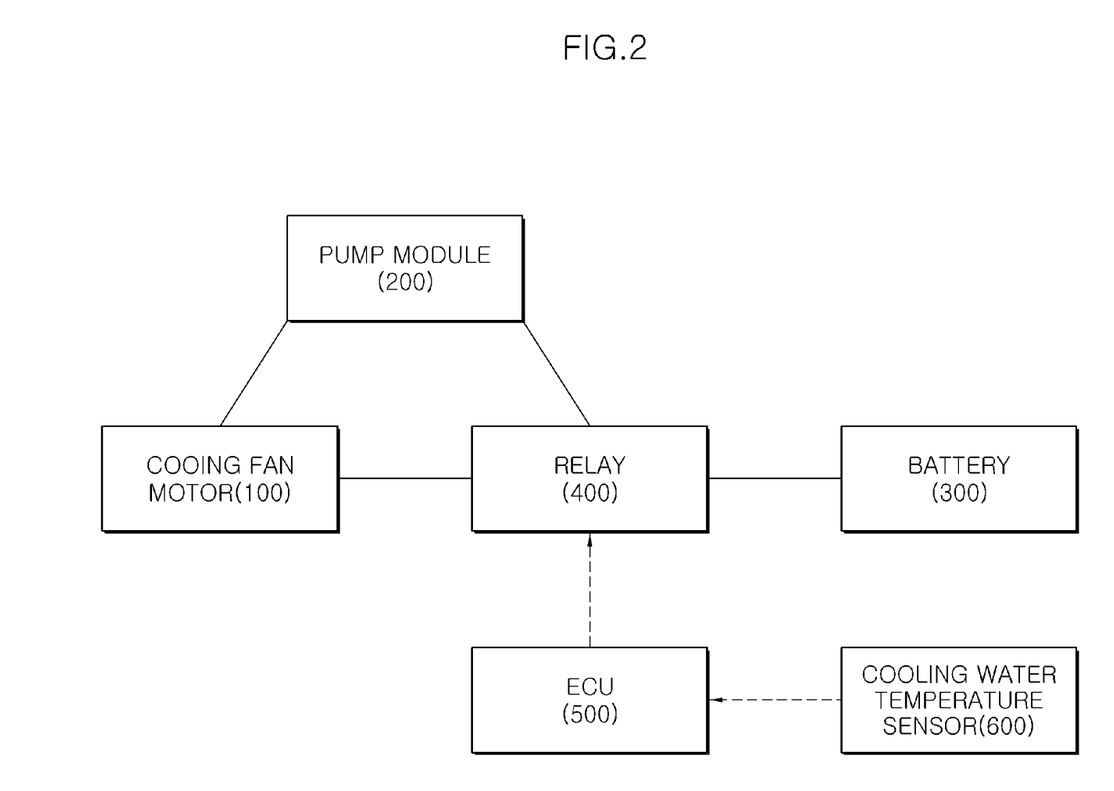
FIG. 2 is a block diagram of an apparatus for controlling a cooling fan speed according to an embodiment of the present inventive concept.

FIG. 2 is a block diagram of an apparatus for controlling a cooling fan speed according to an embodiment of the present inventive concept. Referring to FIG. 2, the apparatus for controlling the cooling fan speed according to an embodiment of the present inventive concept may include a cooling fan motor 100, a pump 200, a battery 300, a relay 400, an electronic control unit (ECU) 500, and a cooling water temperature sensor 600.

The cooling fan motor 100 may operate a cooling fan. That is, the cooling fan motor 100 operates the cooling fan installed at a radiator so as to cool hot cooling water stored in the radiator after cooling an engine. However, it is necessary to alter a rotating speed of the cooling fan motor 100 in accordance with a cooling water temperature. A method for controlling the rotation speed of the cooling fan motor 100 may be described later.

The pump 200 may be connected to the cooling fan motor in series. The pump 200 may be an element substituting the resister according to the prior art and increase a flow speed of the cooling water by utilizing electrical energy which is converted to heat energy and then radiated by the resister according to the prior art in order to control the rotation speed of the cooling fan motor. The configuration and operation of the pump 200 may be described hereafter.

One side of the relay 400 may be connected to the cooling fan motor 100 or the pump 200 and another side thereof may be connected to the battery 300. Therefore, the relay 400 may supply power of the battery 300 to any one of the cooling fan motor 100 or the pump 200. That is, if the one side of the relay 400 is connected to the cooling fan motor 100, the power of the battery 300 is supplied to the cooling fan motor 100 so that the cooling fan motor 100 rotates with a rotational speed corresponding to the supplied voltage. If the one side of the relay 400 is connected to the pump 200, the power of the battery 300 is supplied to the pump 200 so that the pump 200 is operated and thereafter the cooling fan motor 100, which is connected to the pump 200 in series, is rotated by the power of the battery 300. Therefore, a voltage drop is occurred by the operation of the pump 200 such that the cooling fan motor 100 needs to be rotated with the rotational speed corresponding to the dropped voltage, thereby rotated at a low speed compared to the case that the one side of the relay 400 is connected to the cooling fan motor 100. Thus, a cooling fan motor speed can be controlled at the low speed or at a high speed.

The ECU 500 may control the relay 400 in order to supply the power of the battery 300 to any one of the cooling fan motor 100 or the pump 200 in accordance with the cooling water temperature of the engine. The cooling water temperature sensor 600 may measure the cooling water temperature of the engine in order to provide it to the ECU 500. That is, the ECU 500 controls the relay 400 in accordance with the cooling water temperature of the engine measured by the cooling water temperature sensor 600 such that the cooling fan motor speed may be controlled at the low speed or at high speed. A detailed method for controlling the cooling fan motor speed may be described hereafter.

Figure 3:
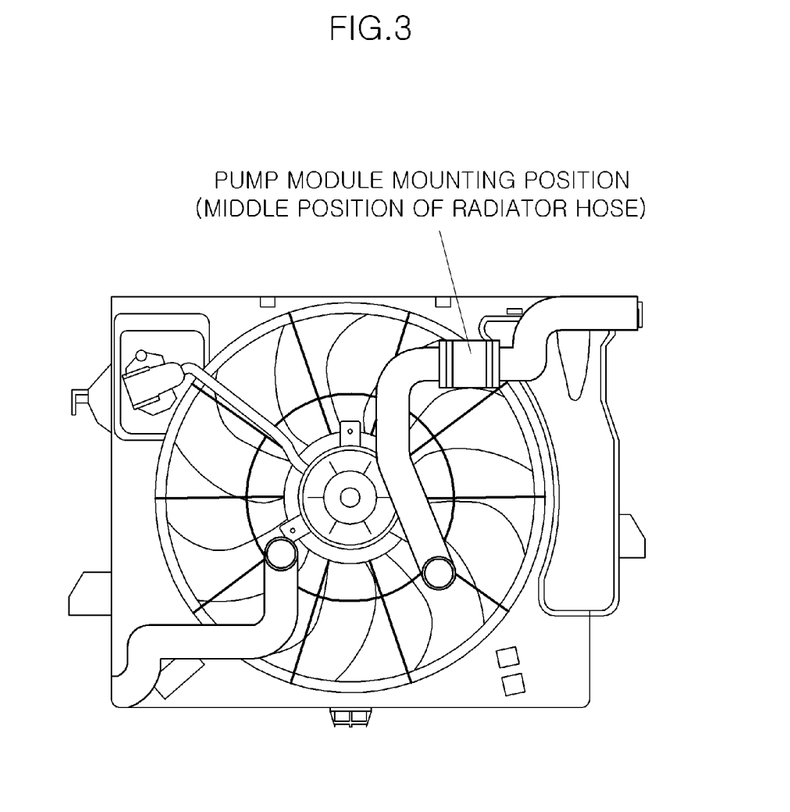
FIG. 3 is a view explaining a mounting position of a pump of the apparatus for controlling a cooling fan speed according to an embodiment of the present inventive concept.
Figure 4:
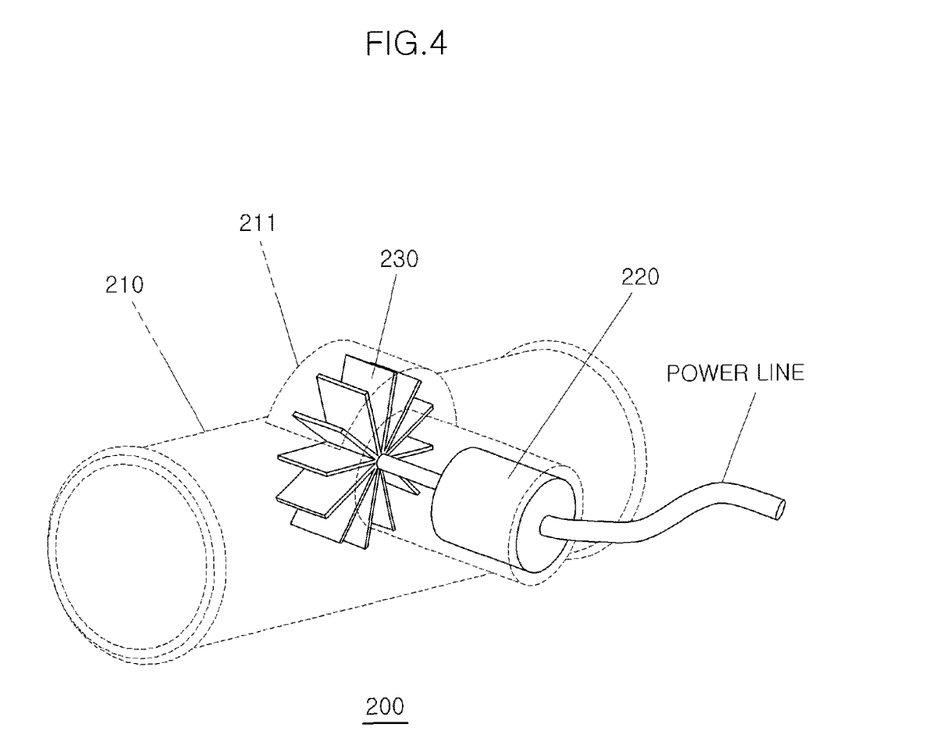
FIG. 4 is a perspective view of a pump of the apparatus for controlling a cooling fan speed according to an embodiment of the present inventive concept.
Figure 5:
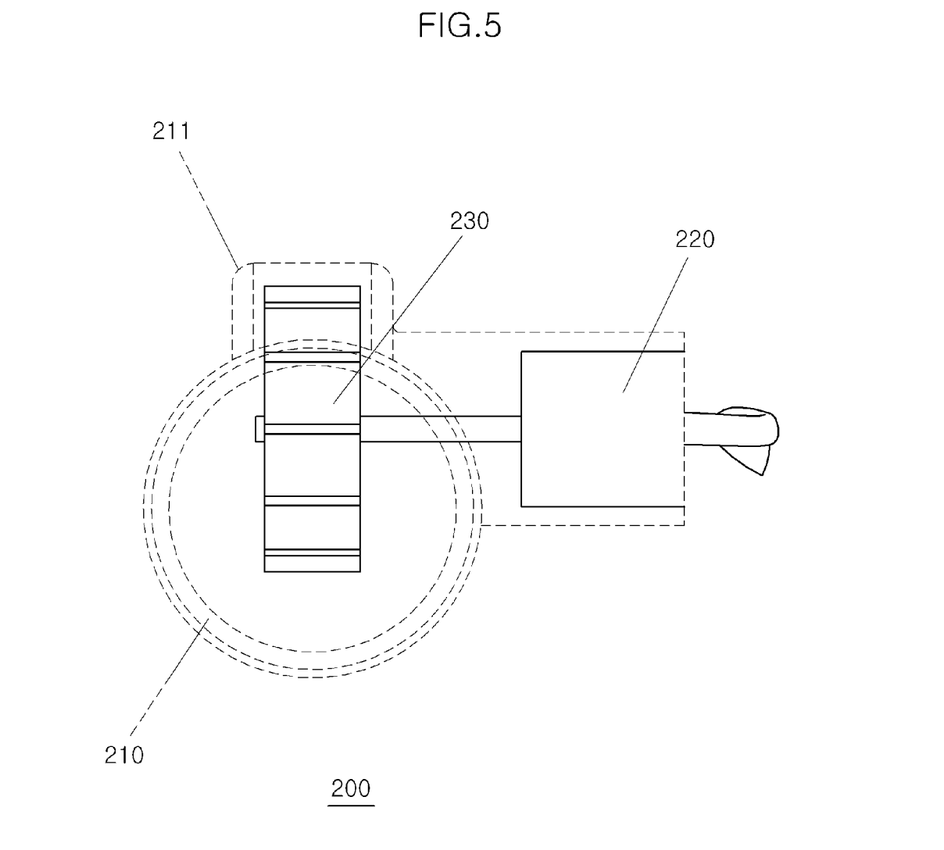
FIG. 5 is a front view of a pump of the apparatus for controlling a cooling fan speed according to an embodiment of the present inventive concept.
Figure 6:
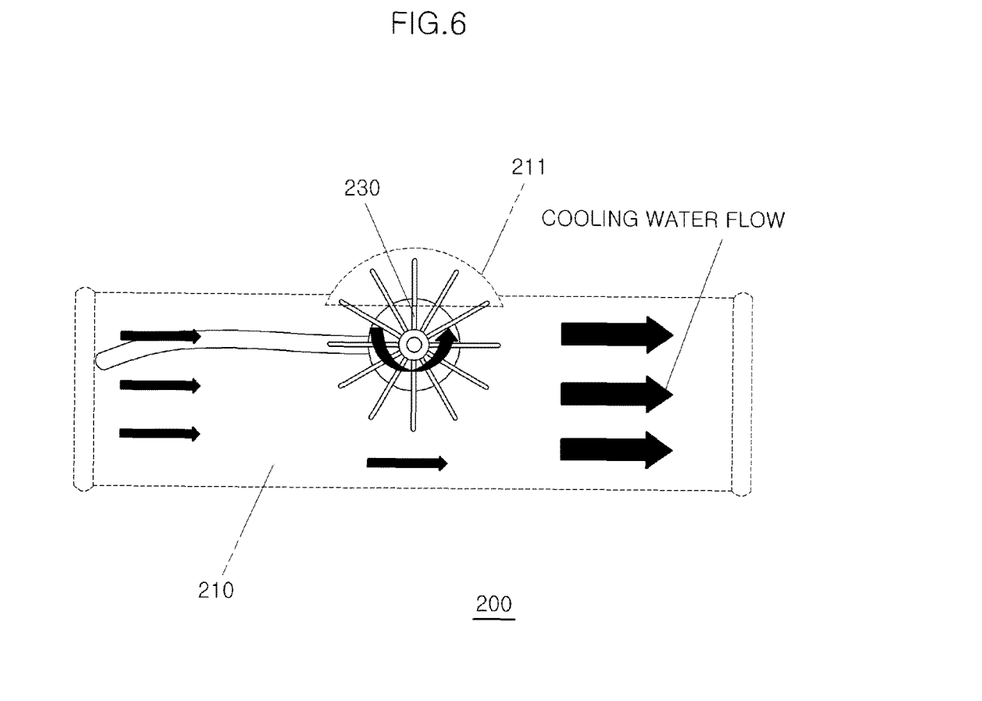
FIG. 6 is a side view of a pump of the apparatus for controlling a cooling fan speed according to an embodiment of the present inventive concept.

FIG. 3 is a view explaining a mounting position of a pump of an apparatus for controlling a cooling fan speed according to an embodiment of the present inventive concept. FIG. 4 is a perspective view of a pump of the apparatus for controlling a cooling fan speed according to an embodiment of the present inventive concept. FIG. 5 is a front view of a pump of the apparatus for controlling a cooling fan speed according to an embodiment of the present inventive concept. FIG. 6 is a side view of a pump of the apparatus for controlling a cooling fan speed according to an embodiment of the present inventive concept. Referring to FIGS. 3 to 6, the pump of the apparatus for controlling the cooling fan speed according to the embodiment of the present inventive concept may include a pump housing 210, an impeller motor 220, and an impeller 230.

The pump housing 210 may have a cylindrical shape, and both ends thereof may be connected with a radiator hose (referring to FIG. 3). The pump housing 210 may include a projection portion 211 having a half cylindrical shape of which an axis is perpendicular to a flow direction of the cooling water. The impeller motor 220 may be directly connected to the relay 400 and disposed perpendicularly about a longitudinal direction of the pump housing 210. The rotation of axis of the impeller 230 may be connected to the impeller motor 220 and promote circulation of the cooling water in accordance with the rotation of the impeller motor 220. The rotation of axis of the impeller 230 may be disposed eccentrically toward the projection portion 211 from a center line of the pump housing 210 perpendicular to the longitudinal direction of the pump housing 210.

When the pump 200 is not operated, the impeller 230 rotates with no load by the flow of the cooling water. When the pump 200 is operated, the impeller 230 rotates to increase a flow speed of the cooling water.

The rotation of axis of the impeller 230 is disposed eccentrically toward the projection portion 211 from the center line of the pump housing 210 because the impeller 230 may greatly interfere the flow of the cooling water if the center line of the pump housing 210 and the rotation of axis of the impeller 230 are collinearly. The impeller 230 may be disposed inside the projection portion 211 in order to minimize a backflow amount of the cooling water by the impeller 230.

Figure 7:
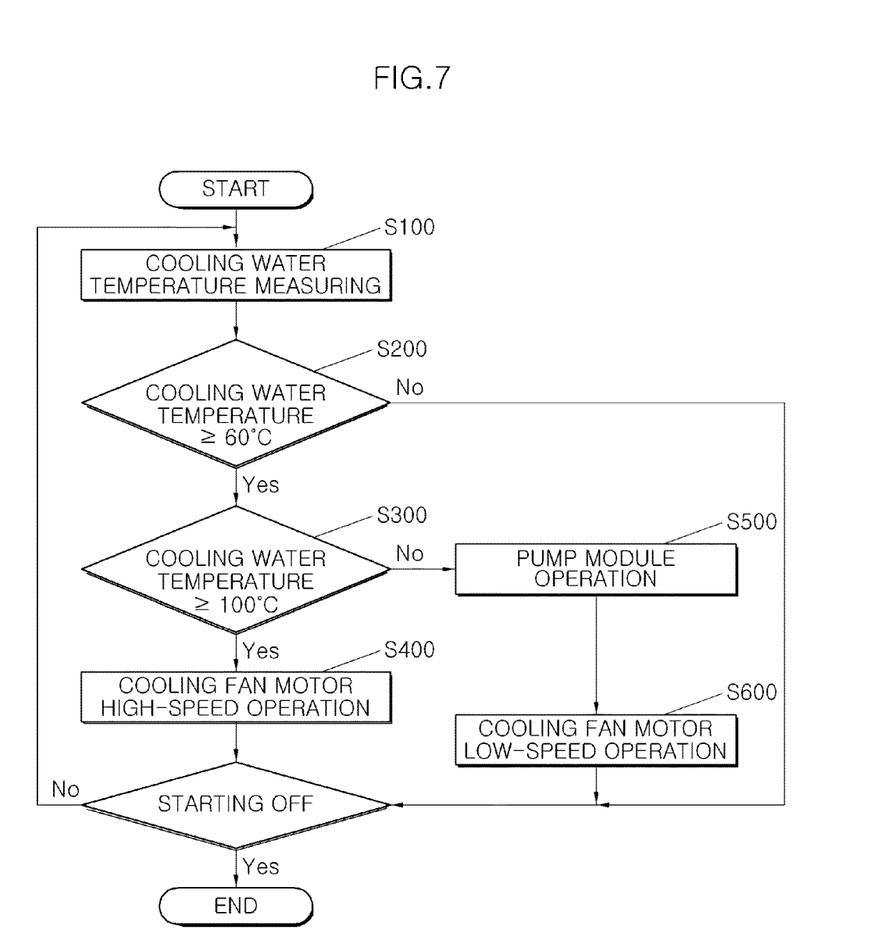
FIG. 7 is a flow chart of a method for controlling a cooling fan speed according to an embodiment of the present inventive concept.

FIG. 7 is a flow chart of a method for controlling a cooling fan speed according to an embodiment of the present inventive concept. Referring to FIG. 7, a method for controlling a cooling fan speed according to an embodiment of the present inventive concept may include a cooling water temperature measuring step S100, a first determination step S200, a second determination step S300, a cooling fan motor high-speed operation step S400, a pump operation step S500, and a cooling fan motor low-speed operation step S600.

The cooling water temperature of the engine is measured in step S100 using the cooling water temperature sensor 600 to control a speed of the cooling fan motor 100 based on the measured cooling water temperature of the engine.

Whether the cooling water temperature measured is more than a first reference temperature is determined in step S200. Step S200 may be performed by the ECU 500. The first reference temperature may be set to 60° C. in accordance with the cooling water temperature, but it is not necessarily limited thereto and may be set differently depending on the situation. The first reference temperature may be stored in a memory connected to the ECU 500. When it is determined that the measured cooling water temperature is less than the first reference temperature, the cooling water temperature measuring step S100 is performed again without operating the cooling fan motor 100 separately.

Whether the cooling water temperature measured is more than a second reference temperature is determined in step S300 when it is determined that the measured cooling water temperature is more than the first reference temperature. At this case, the second determination step S300 may be performed by the ECU 500. The second reference temperature may be set to 100° C. in accordance with the cooling water temperature, but it is not necessarily limited thereto and may be set differently depending on the situation. The second reference temperature may be stored in a memory connected to the ECU 500.

The cooling fan motor 100 is operated in step S400 when it is determined that the measured cooling water temperature is more than the second reference temperature. That is, when it is determined by the ECU 500 that the measured cooling water temperature is more than the second reference temperature, the ECU 500 controls that one side of the relay 400 may be connected to the cooling fan motor 100. Therefore, power of the battery 300 is supplied to the cooling fan motor 100 such that the cooling fan motor 100 rotates at a speed corresponding to the supplied voltage. The cooling fan motor 100 may rotate at a high speed compared to the rotational speed of the cooling fan motor 100.

The pump 200 is operated in step S500 when it is determined that the measured cooling water temperature is less than the second reference temperature. Since the pump 200 is operated in the pump operation step S500, the impeller 230 rotates to increase the flow speed of the cooling water. At this case, the voltage supplied to the pump 200 from the battery 300 through the relay 400 may be dropped in accordance with the operation of the pump 200.

The cooling fan motor 100, which is connected to the pump 200 in series, is operated in step S600 with the voltage dropped at the pump 200 after the pump operation step S500. Since the voltage supplied from the battery 300 through the relay 400 is dropped due to the operation of the pump 200, the cooling fan motor 100 rotates at a speed corresponding to the dropped voltage and at a low speed compared to the cooling fan motor high-speed operation step S400 in which the one side of the relay 400 is connected to the cooling fan motor 100.

The embodiments as discussed previously are merely exemplary embodiments which may enable a person (hereinafter referred to as "a skilled person in the relevant technology"), who has a typical knowledge in a technology field that the present invention belongs to, to execute the present inventive concept easily but is not limited to the aforesaid embodiment and the attached drawings and hence this does not result in limiting the scope of right in this invention. Therefore, it will be apparent to a skilled person in the relevant technology that several transposition, transformation, and change is possible within a scope of not deviating from the technological thought in the present disclosure and it is obvious that a easily changeable part by a skilled person in the relevant technology is included within the scope of right in the present disclosure as well.

What is claimed is:

1. An apparatus for controlling a cooling fan speed, comprising:
    a cooling fan motor configured to operate a cooling fan;
    a pump electrically connected to the cooling fan motor in series; and
    a relay of which one side is electrically connected to the cooling fan motor or the pump and another side thereof is electrically connected to a battery such that a power of the battery may be supplied to any one of the cooling fan motor or the pump,
    wherein, when the one side of the relay is electrically connected to the pump, the power of the battery is supplied to the pump so that the pump is operated and the cooling fan motor, which is electrically connected to the pump in series, rotates by a voltage that is dropped during an operation of the pump,
    wherein the voltage applied to the cooling fan motor is less than a voltage supplied to the pump.

2. The apparatus of claim 1, further comprising an electronic control unit (ECU) configured to control the relay so that the power of the battery may be supplied to any one of the cooling fan motor or the pump in accordance with a cooling water temperature of an engine.

3. The apparatus of claim 2, further comprising a cooling water temperature sensor configured to measure the cooling water temperature of the engine and to provide the cooling water temperature to the ECU.

4. The apparatus of claim 1, wherein the pump includes a pump housing having a cylindrical shape and having both ends connected with a radiator hose.

5. The apparatus of claim 4, wherein the pump housing includes a projection portion having a half cylindrical shape of which an axis is perpendicular to a flow direction of cooling water.

6. The apparatus of claim 1, wherein the pump is directly connected to the relay and includes an impeller motor disposed perpendicularly in a longitudinal direction of a pump housing.

7. The apparatus of claim 6, wherein the pump includes a rotation of axis connected to the impeller motor and an impeller circulating cooling water in accordance with rotation of the impeller motor.

8. The apparatus of claim 7, wherein the rotation of axis of the impeller is eccentric to a projection portion from a center of the pump housing and is perpendicular to the longitudinal direction of the pump housing.

\* \* \* \* \*